United States Patent
Bidkar et al.

(10) Patent No.: US 11,382,110 B2
(45) Date of Patent: Jul. 5, 2022

(54) RADIO MAC SCHEDULING BASED ON FRONT-HAUL TRANSPORT CAPACITY CONSTRAINTS

(71) Applicant: Nokia Solutions and Networks Oy, Espoo (FI)

(72) Inventors: Sarvesh Sanjay Bidkar, Kornwestheim (DE); Silvio Mandelli, Tamm (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/075,010

(22) Filed: Oct. 20, 2020

(65) Prior Publication Data
US 2021/0136790 A1 May 6, 2021

(30) Foreign Application Priority Data
Nov. 4, 2019 (EP) .................................. 19206866

(51) Int. Cl.
*H04W 72/12* (2009.01)
*H04W 28/02* (2009.01)

(52) U.S. Cl.
CPC ......... *H04W 72/1242* (2013.01); *H04L 47/14* (2013.01); *H04W 72/1252* (2013.01); *H04W 72/1284* (2013.01)

(58) Field of Classification Search
CPC ......... H04W 72/1242; H04W 72/1252; H04W 72/1284; H04W 28/02; H04W 28/16; H04W 88/085; H04W 28/0247; H04L 47/14
See application file for complete search history.

(56) References Cited

U.S. PATENT DOCUMENTS

| | | | | |
|---|---|---|---|---|
| 9,787,806 B2* | 10/2017 | Oren | | H04L 69/326 |
| 2015/0215914 A1* | 7/2015 | Cho | | H04W 28/10 |
| | | | | 370/235 |
| 2018/0234875 A1* | 8/2018 | Leroudier | | H04L 5/0001 |

(Continued)

FOREIGN PATENT DOCUMENTS

| | | |
|---|---|---|
| EP | 3531743 A1 | 8/2019 |
| WO | WO-2018/113907 A1 | 6/2018 |

OTHER PUBLICATIONS

European Search Report for European Application No. 20150735.7 dated Aug. 7, 2020.

(Continued)

*Primary Examiner* — Mohamed A Kamara
(74) *Attorney, Agent, or Firm* — Harness, Dickey & Pierce, P.L.C.

(57) ABSTRACT

In certain embodiments, a 5G RAN network has a distributed unit (DU) connected to at least one remote unit (RU) via a transport network (TN) that handles both mobile front-haul (MFH) traffic between the DU and the RUs as well as non-MFH traffic with other end users. A radio scheduler in the DU is configured to perform medium access control (MAC) scheduling for the mobile user traffic, while a TN scheduler in the transport network is configured perform TN scheduling for both the MFH and non-MFH traffic. The TN scheduler is configured to transmit information (e.g., MFH data-rate limits) to the radio scheduler that the radio scheduler uses to perform its subsequent MAC scheduling.

15 Claims, 7 Drawing Sheets

(56) References Cited

U.S. PATENT DOCUMENTS

2018/0376489 A1  12/2018 Andrews et al.
2020/0028639 A1* 1/2020 Lindqvist .............. H04L 5/0046

OTHER PUBLICATIONS

Liem Andrew Tanny et al: "SD-Enabled Mobile Fronthaul Dynamic Bandwidth and Wavelength Allocation (DBWA) Mechanism in Converged TWDM-EPON Architecture", 2018 6th International Conference on Cyber and It Service Management (CITSM), IEEE, Aug. 7, 2018, pp. 1-6,XP033533012.
T. Tashiro, S. Kuwano et al., "A Novel DBA Scheme for TDM-PON based Mobile Fronthaul," in Optical Fiber Communication Conference, OSA Technical Digest (online) (Optical Society of America), 2014.
"IEEE 1914.1, Standard for Packet-based Fronthaul Transport Networks," IEEE, 2019.

* cited by examiner

FIG. 7 ated. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

RADIO MAC SCHEDULING BASED ON FRONT-HAUL TRANSPORT CAPACITY CONSTRAINTS

CROSS-REFERENCE TO RELATED APPLICATIONS

This application claims priority to European Patent Application No. 19206866.6, filed on Nov. 4, 2019, the disclosure of which is incorporated herein in its entirety by reference.

BACKGROUND

Field of the Disclosure

The present disclosure relates to wireless communication networks and, more specifically but not exclusively, to radio medium access control (MAC) scheduling in central radio access networks (C-RAN).

Description of the Related Art

This section introduces aspects that may help facilitate a better understanding of the disclosure. Accordingly, the statements of this section are to be read in this light and are not to be understood as admissions about what is prior art or what is not prior art.

As demand grows for greater volumes of wireless data, the underlying infrastructure needs to be able to meet that demand.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
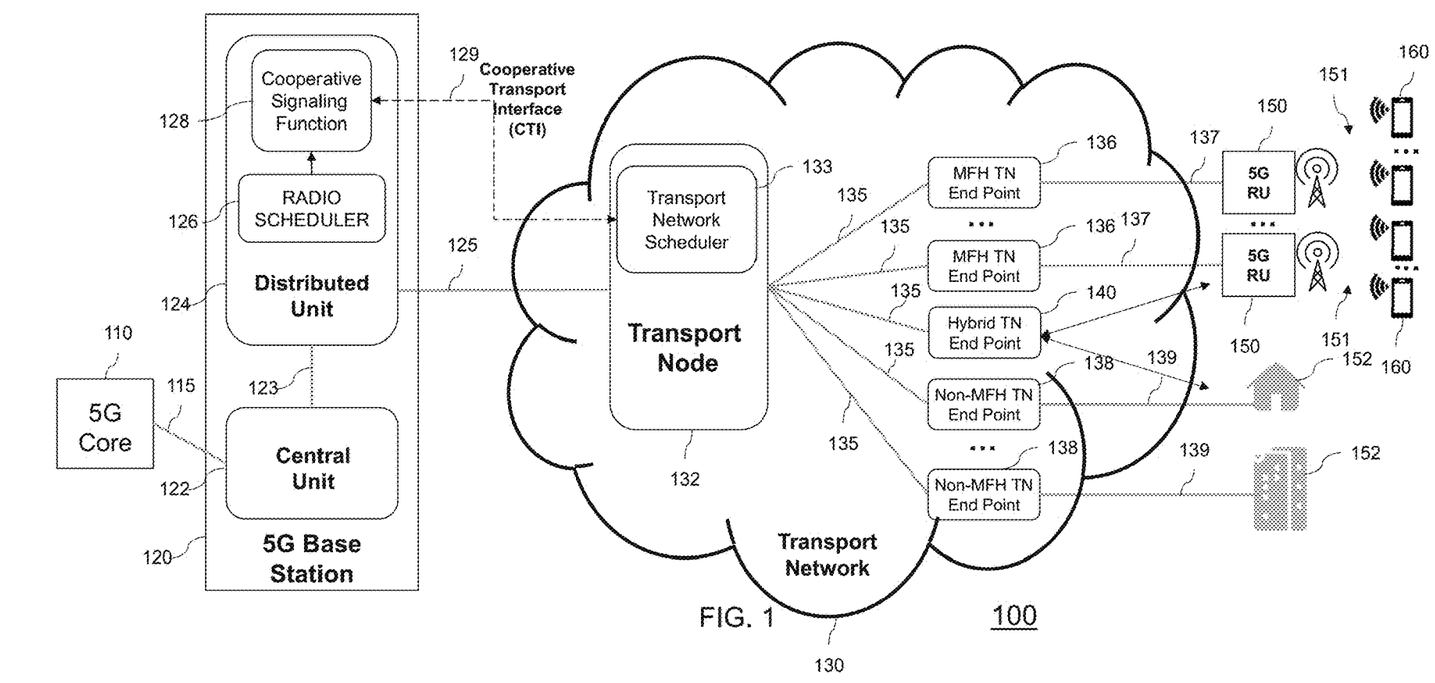
FIG. 1 is a block diagram of a communication network based on the 5G Radio Access Network (5G RAN) architecture according to certain embodiments of the present disclosure.

FIG. 1 is a block diagram of a communication network 100 based on the 5G Radio Access Network (5G RAN) architecture according to certain embodiments of the present disclosure. As shown in FIG. 1, the 5G RAN network 100 comprises a 5G core 110 connected via back-haul link 115 to the central unit (CU) 122 of a 5G base station 120 (also known as a baseband unit or Next Generation Node B (gNB)), which also includes the distributed unit (DU) 124, which may be co-located with and in communication with the CU 122 via link 123 (e.g., an F1 interface of the 3gpp standard). The DU 124 is connected via link 125 to the transport node 132 of a transport network (TN) 130, which also includes one or more mobile front-haul (MFH) TN end points 136 and one or more non-MFH TN end points 138, where each TN end point 136/138 is connected to the transport node 132 via a link 135.

Each MFH TN end point 136 is connected via a corresponding link 137 to a 5G remote unit (RU, also known as a radio unit or remote radio head) 150 that communicates via wireless link(s) 151 with one or more user equipment (UE) devices 160, such as mobile phones and the like. As used herein, the descriptions and solutions related to UE scheduling can also be applied similarly to dedicated radio bearer (DRB) scheduling. Similarly, each non-MFH TN end point 138 is connected via a corresponding link 139 to provide non-MFH services (e.g., enterprise or residential broadband services) to one or more particular end users 152. As known to those skilled in the art, the CU 122, the DU 124, and the RUs 150 are part of a central radio access network (C-RAN) having the transport network 130. As represented in FIG. 1, the transport network 130 may also have one or more hybrid TN end points 140 that handle both traffic with one or more 5G RUs 150 as well as traffic for one or more non-MFH services. The TN scheduler 133 takes these two subsets of traffic into account when performing TN scheduling.

The DU 124 has a radio scheduler 126 that performs medium access control (MAC) scheduling for the 5G UE traffic over the air interface. In particular, the radio scheduler 126 schedules the 5G UE uplink (UL, i.e., upstream) traffic transmitted by the UEs 160 over the wireless links 151 towards the RUs 150 as well as the 5G UE downlink (DL, i.e., downstream) traffic transmitted by the RUs 150 over the wireless links 151 to the UEs 160.

Similarly, the transport node 132 has a TN scheduler 133 that performs scheduling for the TN UL and DL traffic handled by the transport network 130. In particular, the TN scheduler 133 schedules the MFH-related TN UL traffic transmitted from the MFH TN end points 136 to the transport node 132 as well as the non-MFH-related TN UL traffic transmitted from the non-MFH TN end points 138 to the transport node 132. In addition, the TN scheduler 133 schedules the MFH-related TN DL traffic transmitted from the transport node 132 to the MFH TN end points 136 as well as the non-MFH-related TN DL traffic transmitted from the transport node to the non-MFH TN end points 138.

As described further below, the transport network 130 may be a TDM-PON (time-division multiplexed, passive optical network), an Ethernet network, or other suitable type of transport network.

In certain implementations, depending on speed and distance, links 115, 125, 135, 137, and 139 are all bidirectional optical or electrical links that carry packetized data. In other implementations, one or more of those links may be wired or wireless links.

In the embodiment of FIG. 1, the CU 122 and the DU 124 are co-located within the 5G base station 120. In other embodiments, the CU 122 and DU 124 are not co-located. For example, the DU 124 can be remotely located from the CU 122, in which case the CU 122 and the DU 124 are connected via a suitable (optical, wired, or wireless) midhaul link.

Figure 2:
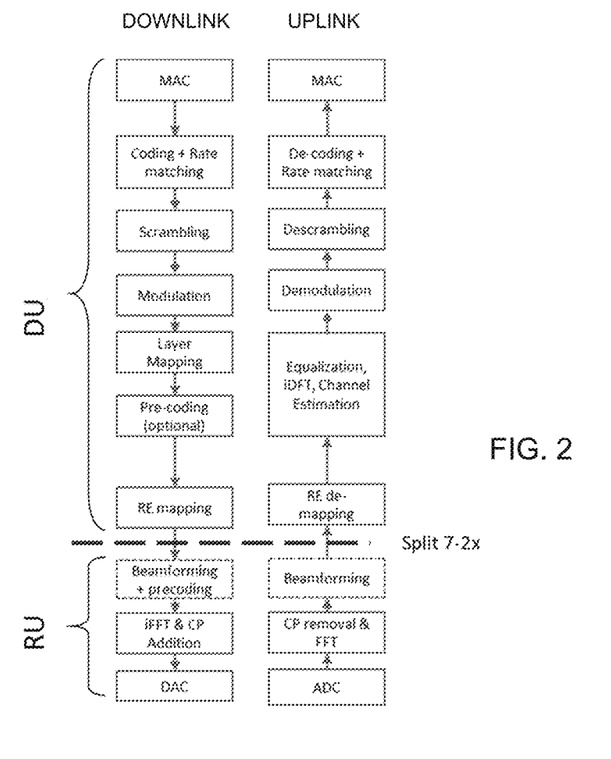
FIG. 2 is a diagram representing the sequences of data processing steps for the 5G downlink and uplink signals in the 5G RAN network of FIG. 1.

FIG. 2 is a diagram representing the sequences of data processing steps for the 5G downlink and uplink signals in the 5G RAN network 100 of FIG. 1. In general, the responsibility for performing these different steps may be shared between the DU 124 and the RUs 150. FIG. 2 represent one possible split referred to as the 7-2× lower-layer split with the DU 124 in the 5G base station 120 performing the upper steps above the beamforming step of FIG. 2, and the 5G RUs 150 performing the lower steps of FIG. 2. Those skilled in the art will understand that the 7-2× split is just one possible distribution of the data processing steps between these different 5G nodes and that the location of the split will depend on the use case or specific deployment. In some implementations, the location of the split may vary over time as a function of the current operating conditions. In theory, the split may occur at different locations for the uplink and downlink processing. Splitting the data processing sequences balances the competing goals of (i) reducing transmission bandwidth through the transport network 130 on the one hand and (ii) sharing processing load between different 5G nodes to have computational resource-pooling gains on the other hand.

A split-processing architecture such as one shown in FIG. 2 leads to statistical traffic profiles for the digitized radio signals sent through the transport network 130 between the RUs 150 and the 5G base station 120 depending on the user-traffic statistics and channel conditions. As such, in certain implementations, the transport network 130 is implemented using a transport technology that employs statistical multiplexing over a shared medium, such as TDM-PON transport technology or Ethernet transport technology. Such split-processing architectures are promoted in the industry with specifications such as IEEE 1914.1, eCPRI group, and the ORAN consortium. Note that it is also possible to use (e.g., fiber or WDM (wavelength-division multiplex) based) point-to-point connections in other implementations.

In general, lower-layer processing splits, such as the 7-2× split of FIG. 2, and higher-layer processing splits will have different transport requirements in terms of data rate and latency as well as different benefits or advantages for centralized processing. Lower-layer splits are good candidates for implementation, leaving significantly lower processing requirements at the antenna sites, thereby reducing the costs of the RUs 150. However, this split option requires a low-latency transport network 130 which becomes challenging for statistical multiplexing technologies (e.g., TDM-PON or Ethernet) since they can be congested in certain scenarios of oversubscription and hence incur additional delay and packet losses, which is difficult for conventional C-RAN networks to control.

These congestions may be due to unexpected, i.e., not provisioned, offered mobile traffic. This may happen for different reasons in a statistically multiplexed network. For instance, assume that the 5G RAN network 100 was provisioned based on a certain offered traffic profile, with some degree of "overbooking" (e.g., to have a guaranteed supported traffic equal to 99% of the cumulative distribution function (CDF) of the traffic). If the non-MFH services subscribed to the network 100 are not fully using their shares of the allocated bandwidth, then some amount of unexpected MFH traffic can still be handled by the transport network 130. However, if all of the non-MFH services are fully using their shares, then the shared transport network 130 will not be able to handle unexpected offered MFH traffic that exceeds the agreed Service Level Agreements (SLAs).

Conventional radio schedulers are agnostic of the C-RAN architectures and assume a perfect transport network (lossless with guaranteed latency and no jitter) between the RU and the DU/CU. In contrast to the Common Public Radio Interface (CPRI) standard, as C-RAN architectures evolve with split-processing base stations, the traffic between the RU and DU/CU becomes statistical depending on the cell load (due to low-layer/high-layer split options).

In this context, transport networks with statistical multiplexing technologies (e.g., TDM-PON, Ethernet) can be used to support cell densification cost effectively. However, shared statistical multiplexing transport networks can lead to uncontrolled delay or packet loss in certain high-congestion scenarios. If there is no feedback about transport network conditions to the radio scheduler, then the radio scheduler is not able to adapt scheduling decisions to guarantee flow quality of service (QoS) in terms of latency/reliability or bit rate. In this case, the overall radio system performance may suffer along with certain services that are sensitive to delays and packet loss (e.g., ultra-reliable low-latency communication (URLLC)).

The present disclosure describes mechanisms to provide feedback about transport network conditions to the radio scheduler and to adapt radio scheduler decisions based on the feedback from the transport network to preserve QoS, where needed and possible. In particular, with respect to the 5G RAN communication network 100 of FIG. 1, some coordination between the radio scheduler 126 and the transport network scheduler 133 via the Cooperative Transport Interface (CTI) AV can improve system performance. Note that, in some implementations, the DU 124 may provide some or all of the feedback received from the TN scheduler 133 to the CU 122 via the interface 123.

Using the CTI interface AV, the radio scheduler 126 requests a certain data rate on behalf of each RU 150. This data rate is equivalent to the estimated or predicted MFH traffic demand from the RU 150 in the future depending on the RU load. The transport network 130 is shared between MFH services and non-MFH services. As such, MFH services are restricted to a fair share (depending on their SLAs). Without the knowledge of the current constraints of the transport network 130, the decisions of the radio scheduler 126 may generate traffic beyond the front-haul capacity of the transport network 130, which can lead to excessive delay and/or packet loss, ultimately causing performance issues for the 5G RAN communication network 100.

With the diffusion of radio systems operating in unlicensed spectrum, a large amount of offered mobile traffic may need to be dealt with. Therefore, it is safe to assume that such traffic will be treated with the same priority as enterprise or residential broadband services. Moreover, in scenarios where the transport network 130 is shared between MFH and non-MFH services, these services' owners will negotiate TN costs and SLAs. As a result, the MFH services may be limited in priority after its SLAs are already satisfied. In particular, the TN scheduler 133 will likely provision the MFH services to have their TN share based on some traffic statistics profile.

The present disclosure proposes the following:
Mechanisms to provide feedback to the radio scheduler 126 from the TN scheduler 133 with respect to the characteristics, resource availability, and/or constraints of the transport network 130; and
Adaptation to radio MAC scheduling for split-processing RAN architectures that use statistical multiplexing transport technologies (e.g., TDM-PON, Ethernet) for front-haul traffic. This enables better preservation of end-to-end (E2E) QoS for the latency-critical and high-priority flows, offloading performance degradation to best-effort/low-priority flows.

The following discussion describes embodiments employing the TDM-PON transport technology, but similar techniques would be possible for other transport technologies using statistical multiplexing with dynamic bandwidth (or other resource) allocation, such as (without limitation) Ethernet transport technology. TDM-PON is a low-cost and resource-efficient transport technology based on statistical multiplexing of traffic over a single TDM wavelength channel. TDM-PON is currently used for residential or business broadband access. A goal of this disclosure is to use TDM-PON for the radio front-haul traffic to support cell densification using small cells.

Figure 3:
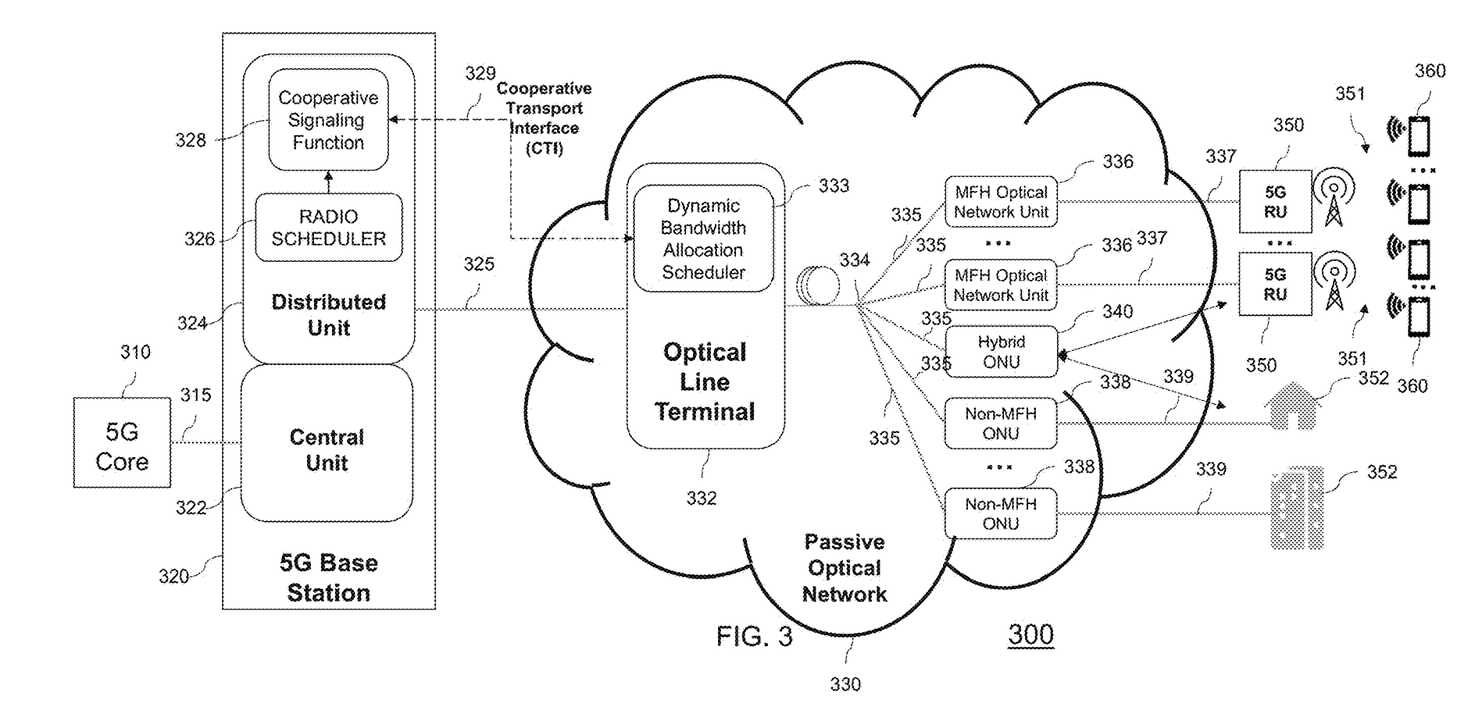
FIG. 3 is a block diagram of an instance of the 5G RAN communication network of FIG. 1 in which the transport network of FIG. 1 is implemented as a TDM-PON transport network.

FIG. 3 is a block diagram of an instance 300 of the 5G RAN communication network 100 of FIG. 1 in which the transport network 130 of FIG. 1 is implemented as a TDM-PON transport network 330 in which:
The transport node 132 of FIG. 1 is an optical line terminal (OLT) 332;
The transport network scheduler 133 of FIG. 1 is a TN scheduler 333 that performs dynamic bandwidth allocation;
Each end point 136/138 of FIG. 1 is an optical network unit (ONU) 336/338; and
The links 135 of FIG. 1 are optical links 335.

As shown in FIG. 3, the TDM-PON 330 also has an optical splitter/combiner 334 that splits the downlink optical signal from the OLT 332 and combines the uplink optical signals from the ONUs 336 and 338. All other elements of the 5G RAN network 300 of FIG. 3 are analogous to the similarly labeled elements of the 5G RAN network 100 of FIG. 1. As represented in FIG. 3, the TDM-PON transport network 330 may also have one or more hybrid TN ONUs 340 that handle both traffic with one or more 5G RUs 350 as well as traffic for one or more non-MFH services. The TN scheduler 333 takes these two subsets of traffic into account when performing TN scheduling.

According to certain embodiments of the disclosure, the radio scheduler 326 of FIG. 3 bases scheduling decisions on different information, such as, for example, the following conventional information:
UE ranks, link-adaptation decisions (based on SINR (signal-to-interference-plus-noise ratio) estimates and CQI (Channel Quality Indicator) reports);
UE previous allocation history (e.g., average data rates in proportional fair scheduling);
UE buffer status (e.g., whether the UEs have data to transmit); and
UE (/DRB (dedicated radio bearer)) and/or slice QoS information, which can be derived from 5QI (5G QoS Indicators), but also consider other proprietary signals.

In addition, the scheduling decisions of the radio scheduler 326 are also based on front-haul transport network status or load-limit information received from the TN scheduler 333. Service prioritization on the radio scheduler 326 is based on the knowledge of the above information to fit within radio resource limitations or constraints.

The MAC scheduling decisions of the radio scheduler 326 are translated into required front-haul data rates based on resource utilization of each cell and communicated to the TN scheduler 333 using specific control messages via the CTI interface 329. One such example is the use of Cooperative-Dynamic Bandwidth Allocation (Co-DBA) messaging from the radio scheduler 326 to the OLT TN scheduler 333 in the case of PON transport networks as taught by T. Tashiro, S. Kuwano, J. Terada, T. Kawamura, N. Tanaka, S. Shigematsu, and N. Yoshimoto, "A Novel DBA Scheme for TDM-PON based Mobile Fronthaul," in Optical Fiber Communication Conference, OSA Technical Digest (online) (Optical Society of America, 2014), paper Tu3F.3, the teachings of which are incorporated herein by reference in their entirety. However, that Co-DBA messaging is a one-way communication from a conventional radio scheduler to a conventional TN scheduler, and there is no feedback from the transport network about the provisioning of this required data rate. As such, in the case of oversubscription, the transport network will delay and/or drop radio data, thereby adversely affecting end-to-end services.

The present disclosure proposes a mechanism to convey information about the characteristics and/or status of the front-haul transport network 330 to the radio scheduler 326 and for the radio scheduler 326 to use that information in performing radio MAC scheduling.

Figure 4:
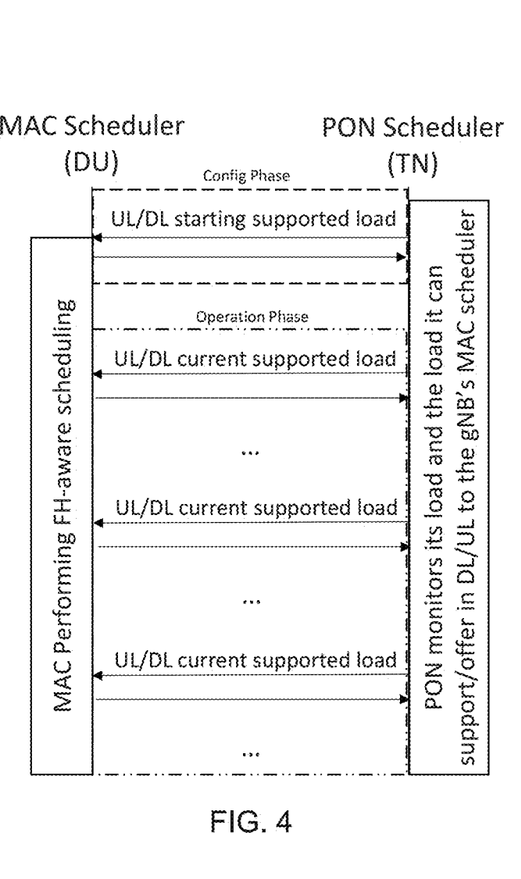
FIG. 4 illustrates the main components and working principles of certain embodiments of this disclosure.

FIG. 4 illustrates the main components and working principles of certain embodiments of this disclosure. The OLT TN scheduler 333 operates/allocates TN resources in the data-rate (DR) (or bps (bits per second)) dimension. The data rate of the TDM-PON transport network 330 can be translated into a "load" in the context of the radio scheduler 326, depending on the type of signals transported between the DU 324 and the RUs 350, which in turn depends on the particular type of split processing implemented within the 5G RAN network 300.

During a configuration phase, the radio scheduler 326 initially asks for an allocation of certain data rate from the OLT 332, which can support an equivalent uplink/downlink load. During the subsequent operational phase, if the TN scheduler 333 detects the need to change the default DR allocation/current DR allocation of the front-haul services, for example, due to a potential/current congestion situation, then the TN scheduler 333 transmits, via the CTI interface 329 to the radio scheduler 326, a new maximum data rate sustainable by the transport network 330 and its overall condition. This data rate is translated into a maximum supported load for the radio scheduler 326. The radio scheduler 326 updates its parameters and implements a radio scheduler strategy that can consider load conditions and transport bandwidth availability for real-time scheduling decisions.

The information conveyed via the CTI interface 329 can be periodic or on-demand through properly designed signaling. This information can be enhanced by other feedback information, e.g., the transport network delay, jitter, packet drops for front-haul traffic flows. This information can be used by non-real-time processing at the DU 324 and/or the CU 322 to react on transport-layer status, e.g., making some Radio Admission Control decisions for some QoS flows.

Referring to FIG. 4, time flows from top to bottom with the TN scheduler 333 transmitting, via the CTI interface 329 to the radio scheduler 326 during the configuration phase, data rate limits for use in scheduling the initial uplink and downlink loads to be transmitted through the transport network 330, and the radio scheduler 326 transmitting, via the CTI interface 329 to the TN scheduler 333, an acknowledgement (ACK) message indicating receipt of that information. During the operational phase, either periodically or as needed (depending on the particular implementation), the TN scheduler 333 transmits current data rate limits to the radio scheduler 326 for use in scheduling subsequent uplink and downlink loads. Note that, depending on the implementation, the TN scheduler 333 may transmit a single data rate limit for both uplink and downlink traffic or independent data rate limits for uplink traffic and for downlink traffic with those limits updated at the same time or at different times. Note further that, in some implementations. Note further that, in other implementations, instead of transmitting explicit data rate limits, the TN scheduler 333 transmits to the radio scheduler 326 some other form of bandwidth-related information indicating that there is insufficient bandwidth for transmitting the MFH traffic through the transport network 330.

Figure 5:
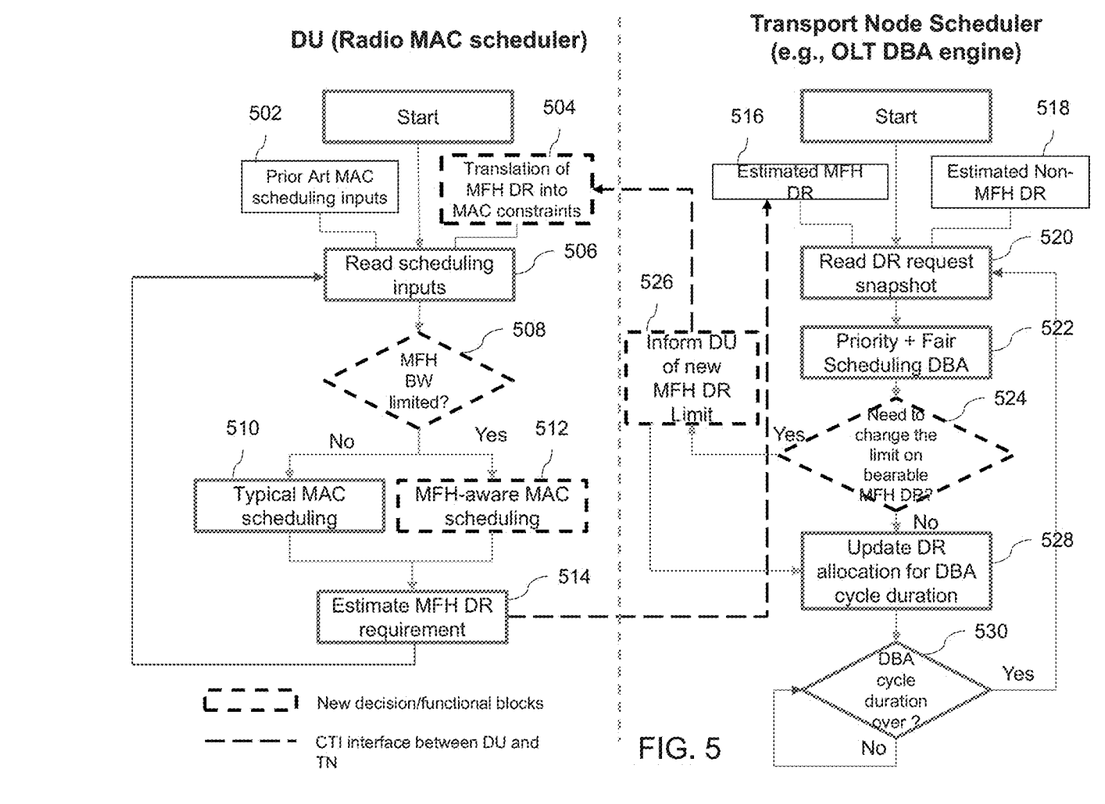
FIG. 5 is a flow diagram of processing performed by the radio scheduler (steps 502-514) and the TN scheduler (steps 516-520) of FIG. 3 according to certain embodiments of the disclosure.

FIG. 5 is a flow diagram of processing performed by the radio scheduler 326 (steps 502-514) and the TN scheduler 333 (steps 516-520) of FIG. 3 according to certain embodiments of the disclosure. In certain implementations, the processing shown in FIG. 5 is executed independently and in parallel for both the uplink and the downlink traffic. In other implementations, the processing of FIG. 5 is implemented for both the uplink and downlink traffic in a single aggregated algorithm. The following description refers to an independent execution for the uplink traffic. An analogous execution would apply for the downlink traffic.

In particular, for uplink traffic, the radio scheduler 326 executes steps 502-514 to perform MAC scheduling for the mobile UL traffic from the UEs 360, while the TN scheduler 333 executes steps 516-520 to perform scheduling for both the MFH UL traffic and the non-MFH UL traffic handled by the transport network 330.

Referring first to the steps executed by the radio scheduler 326, step 502 refers to the provision of conventional inputs to the MAC scheduling performed by a prior-art radio scheduler (listed previously), while step 504 refers to the translation of data-rate information received via the CTI interface 329 from the TN scheduler 333. As described further below, the TN scheduler 333 transmits an UL data-rate limit for the radio scheduler 326 to use as a constraint in scheduling the MFH UL traffic. In step 506, the radio scheduler 326 reads the inputs from steps 502 and 504.

In step 508, the radio scheduler 326 determines whether the data-rate limit received from the TN scheduler 333 warrants the performance of a non-conventional MAC scheduling algorithm. In some implementations, in step 508, the radio scheduler 326 compares the received data-rate limit to a specified data-rate threshold (based on the configuration of the RU(s) resources scheduled by the radio scheduler 326, the limitations given by the standardized modulation-coding schemes and/or the quantization of the complex symbols to be sent/received by the RUs). If the radio scheduler 326 determines that the received data-rate limit is greater than the specified data-rate threshold, then the radio scheduler 326 performs conventional (i.e., MFH-agnostic) MAC scheduling in step 510. If, however, the radio scheduler 326 determines that the received data-rate limit is less than the specified data-rate threshold, then the radio scheduler 326 performs non-conventional (i.e., MFH-aware) MAC scheduling in step 512. Different versions of the non-conventional MAC scheduling of step 512 are described further below. Note that, in alternative implementations, the radio scheduler 326 always performs the non-conventional MAC scheduling. In that case, steps 508 and 510 may be eliminated from FIG. 5.

As part of either the conventional MAC scheduling of step 510 or the non-conventional MAC scheduling of step 512, the radio scheduler 326 generates in step 514 an estimate of the transport network data rate required to support the upcoming MFH UL traffic through the transport network 330 and transmits that MFH UL DR estimate to the TN scheduler 333, after which processing returns to step 506.

Referring now to the steps executed by the TN scheduler 333, step 516 refers to the provision of the estimated MFH UL data rate received from the radio scheduler 326, while step 518 refers to the conventional provision of an estimate of the data rate required to support the upcoming non-MFH UL traffic through the transport network 330. In step 520, the TN scheduler 333 reads the inputs from steps 516 and FI.

In step 522, the TN scheduler 333 performs conventional TN scheduling, such as, for example, priority plus fair scheduling, for the upcoming MFH and non-MFH UL traffic through the transport network 330. During this TN scheduling, the TN scheduler 333 will determine the data rate allocated for the upcoming MFH UL traffic.

In step 524, the TN scheduler 333 determines whether to transmit a data-rate limit to the radio scheduler 326. In some implementations where the TN scheduler 333 periodically transmits DR limits, the TN scheduler 333 transmits the current MFH UL DR estimate as a DR UL limit to the radio scheduler 326 whenever the TN scheduler 333 determines that it is time to do so. In other implementations where the TN scheduler 333 transmits DR limits only when needed, the TN scheduler 333 compares the current MFH UL DR estimate to the previous MFH UL DR limit transmitted to the radio scheduler 326 to determine whether that MFH UL DR limit needs to be updated. In particular, the TN scheduler 333 will determine that the MFH UL DR limit will need to be updated when the current MFH UL DR estimate differs from the previous MFH UL DR limit by more than a specified magnitude threshold. If so, then, in step 526, the TN scheduler 333 transmits the current MFH UL DR estimate to the radio scheduler 326 as the new MFH UL DR limit.

Whether or not step 526 is performed, according to conventional steps 528 and 520, the TN scheduler 333 updates the DR allocation in step 528 for the current dynamic bandwidth allocation (DBA) cycle until the TN scheduler 333 determines in step 520 that the current DBA cycle has been completed, at which point processing returns to step 520.

In the processing of FIG. 5, the TN scheduler 333 monitors conditions that require limiting of the MFH data rate compared to what is requested by the radio scheduler 326. This is done using a snapshot of the DR requests of MFH and non-MFH services and considering their respective SLAs. In a non-limited scenario, the TN scheduler 333 can allocate the requested MFH DR. However, depending on the service mix (e.g., enterprise or residential broadband, mobile back-haul, etc.) on the transport network 330 and their traffic statistics, the TN scheduler 333 may have to limit the MFH DR and provide a feedback to the radio scheduler 326. The cooperative signaling function 328 at the DU 324 translates the DR limit into a load limit that is understood by the radio scheduler 326 depending on what signals are transported between the DU 324 and the RUs 350. This load limit is then considered by the radio scheduler 326 in its MAC scheduling decisions. Depending on the MAC scheduling decisions of the radio scheduler 326, the cooperative signaling function 328 can translate these decisions into an equivalent MFH DR request to be sent to the TN scheduler 333 via the CTI interface 329.

For non-MFH applications, the TN scheduler 333 runs a DBA procedure periodically to calculate the TN DR allocations to different non-MFH services based on their usage of previous allocations and demands based on buffer reports. These non-MFH DR allocations stay the same for the duration of the DBA cycle and are updated every DBA cycle duration (typically a few milliseconds, e.g., 8 ms).

For MFH applications, the TN DR allocations for MFH services need to change ideally at the rate at which the radio scheduler 326 grants changes so that there is exact allocation for each MFH service and hence no buffering at the MFH ONUs 336. In the case of the LTE (Long-Term Evolution) standard, this rate is 1 ms due to its scheduling granularity such that the radio scheduler 326 will transmit CTI DR request messages every 1 ms to the TN scheduler 333. The TN scheduler 333 will allocate the exact DRs requested by the MFH services at the same time granularity (i.e., 1 ms) as long as the total DR is within the overall limit of the DR allocated to the MFH services in that DBA cycle.

In the transport network 330, where MFH and non-MFH services are multiplexed on the same TDM-PON, the DBA for MFH services can operate at the frequency of the radio scheduler 326 (equivalently the CTI DR message frequency of every 1 ms, in the case of the LTE standard) and update the DR allocations for MFH services. However, the DBA for non-MFH services can still operate at the frequency of the DBA cycle duration (for example, 8 ms). Therefore, during the DBA computation of the non-MFH services, it is possible for the TN scheduler 333 to detect that there is a need to limit MFH services to a certain data rate so that the non-MFH services can fulfill their SLAs. This limitation will be applicable until the end of the current DBA cycle, at the end of which, the non-MFH DBA can assign a new non-MFH DR limit. Since this information is available at the start of the DBA cycle, the TN scheduler 333 can communicated the information to the radio scheduler 326 to limit the MAC DR requests and perform scheduling accordingly. The DBA for non-MFH services can also make longer-term predictions (few 100s of ms) or estimations on the DR requirements of the non-MFH services and update the DR limits for MFH services more infrequently.

This procedure does not cause any issues for downlink mobile operations, since the radio scheduler 326 makes its decisions just before the DL mobile resources allocation. However, for LTE specifications, uplink scheduling decisions are made 4 ms before the actual UL transmission is to occur. This can lead to mismatches in the current supported UL DR by the MFH and the scheduled UL transmissions. Embodiments of the present disclosure avoid degraded UL and DL transmissions when the OLT 332 is congested by designing proper procedures for the few UL slots when a change in the MFH UL DR limit has occurred.

Figure 6:
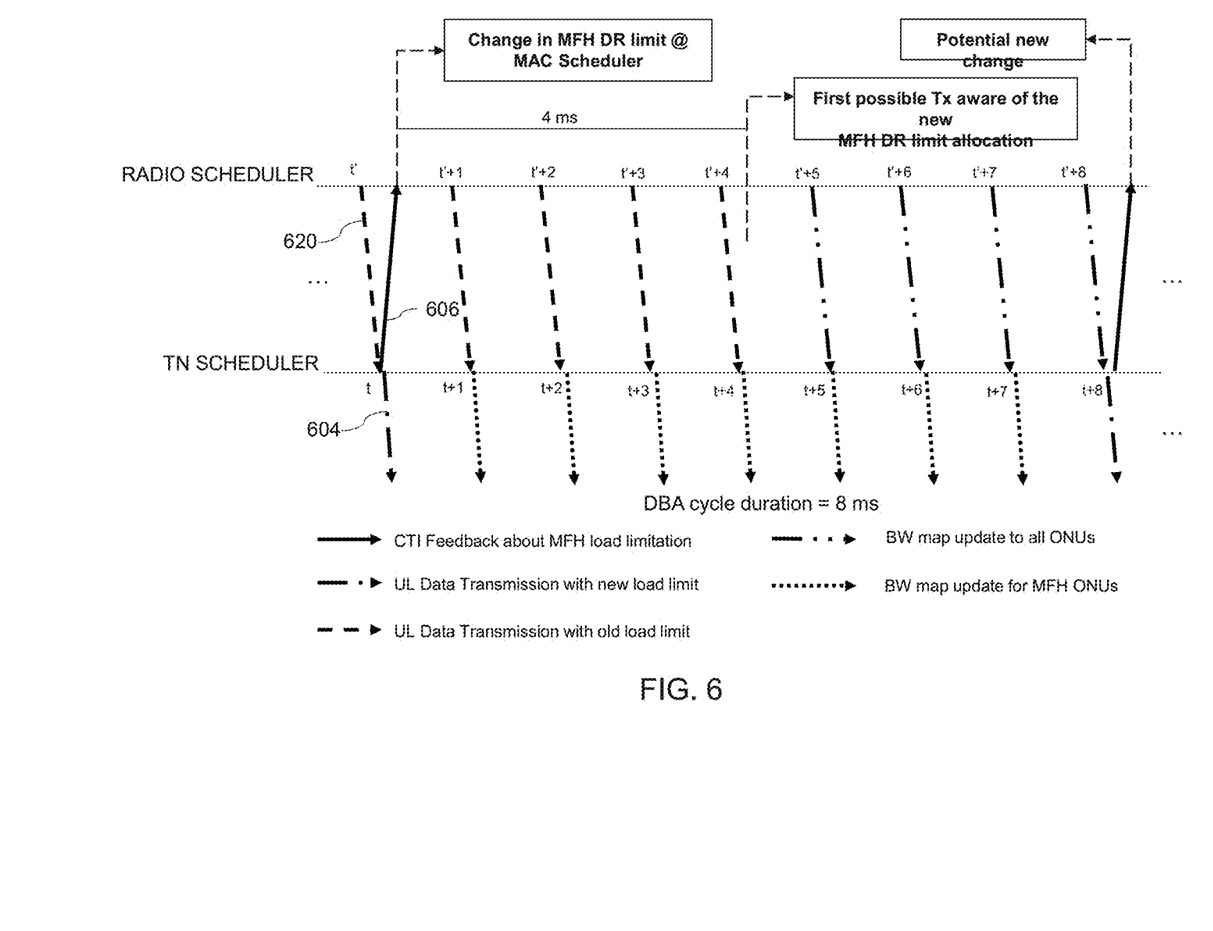
FIG. 6 presents an example timeline of the processing by the radio scheduler and the TN scheduler of FIG. 3 for UL transmissions.

FIG. 6 presents an example timeline of the processing by the radio scheduler 326 and the TN scheduler 333 of FIG. 3 for UL transmissions, where time flows from left to right. In this example, every 1 ms, the radio scheduler 326 transmits CTI messages with DR requests corresponding to MFH UL transmissions happening 4 ms in the future. Therefore, at the start of every non-MFH DBA cycle, there are already 4 MAC-scheduled MFH DR requests in the OLT DBA engine that still need to be fulfilled by the TN scheduler 333. However, if the TN scheduler 333 allocates more DR to non-MFH services to meet their SLAs, then the TN scheduler 333 may have to change the limit on the MFH DR for future allocations as soon as the DBA cycle allocation is made. This affects partially the current DBA cycle (e.g., the remaining 4 ms of the DBA cycle).

In particular, at time t', a set of MFH UL data transmissions occur that were previously scheduled by the radio scheduler 326 using an existing MFH UL DR limit. At that time t', the radio scheduler 326 transmits (arrow 602) the MFH UL DR estimate for those transmissions to the TN scheduler 333. At time t (i.e., the start of a new non-MFH DBA cycle), the TN scheduler 333 schedules the MFH and non-MFH UL transmissions from the ONUs 336 and 338 and transmits (arrow 604) updated bandwidth (BW) maps to the ONUs 336 and 338. In addition, at time t, the TN scheduler 333 determines that the existing MFH UL DR limit at the radio scheduler 326 needs to be updated, and the TN scheduler 333 transmits (arrow 606) an updated MFH UL DR limit to the radio scheduler 326.

The radio scheduler 326 starts using that updated MFH UL DR limit right away, but since the radio scheduler 326 schedules MFH UL transmission 4 ms in advance, there are already four MFH UL transmissions scheduled using the previous MFH UL DR limit. As such, at times t'+1, t'+2, t'+3, and t'+4, four more MFH UL transmissions occur that were already scheduled by the radio scheduler 326 using the previous MFH UL DR limit. In addition, at times t+1 through t+7, the TN scheduler 333 updates the BW maps for the MFH ONUs 336, but not for the non-MFH ONUs 338 since the DBA scheduling cycle occurs every 8 ms.

Eventually (i.e., starting at time t'+5), MFH UL transmissions start to occur that were scheduled by the radio scheduler starting at time t'+1 using the updated MFH UL DR limit. The current non-MFH DBA cycles ends at time t+7, and the next non-MFH DBA cycle begins at time t+8, where another updated MFH UL DR limit may be needed.

Depending on how the load conditions are defined, three different non-conventional approaches for signaling and scheduling can be considered. The approach could be selected/set during the initialization of the 5G RAN network 300 of FIG. 3, when the CU 322, the DU 324, and the RUs 350 are linked and initialized.

Depending on the DU-RU processing split, different types of information are conveyed through the transport network 330 corresponding to different possible "load" limits involved in the MAC scheduling operations of the radio scheduler 326. Three of the different possible types of information are quantized complex symbols, encoded bits, and information bits.

When the DU-RU processing split occurs just below the beamforming steps of FIG. 2 such that forward and inverse fast Fourier transforms (FFT and iFFT) are performed at the RUs 350, and all of the upper steps in FIG. 2 are performed at the DU CG, quantized complex symbols are transmitted through the transport network 330. In that case, it is sufficient for the radio scheduler 326 to have a limitation in the maximum number (Max_PRBs) of physical resource blocks (PRBs) (Max_PRBs) that the radio scheduler 326 can schedule for each transmission time interval (TTI). In some implementations, this number can be substituted by (i) the maximum number (Max_SymRate) of time-frequency symbols that can be transmitted in a certain time window (Time Window) or (ii) the maximum bandwidth (Max_AllocatedBandwidth) that the radio scheduler 326 can allocate. The TN data rate limit can be translated by the DU 324 into a maximum number of PRBs of maximum allocated bandwidth, taking into account subcarrier spacing and slot duration. Therefore, the limit on the signal can be just a data-rate itself.

When the DU-RU processing split occurs just above the modulation/demodulation steps of FIG. 2, such that the RUs 350 perform those modulation/demodulation steps and all of the lower steps in FIG. 2, and the DU 324 performs all of the upper steps in FIG. 2, encoded bits are transmitted through the transport network 330 in the downlink direction and log-likelihood ratio (LLR) values for the encoded bits are transmitted through the TN network 330 in the uplink direction. In that case, the transport network 330 could impose a limit on the radio scheduler 326 for (i) the number (Max_GrossTP) of scheduled encoded "gross" throughput or (ii) the number (Max_EncodedBits) of encoded bits to be transmitted in a given time window (TimeWindow). These limits can be better derived internally by the DU 324, which knows its internal parameters, once the transport network 330 shares its data-rate limit.

When all of the processing steps below the MAC steps of FIG. 2 are performed at the RUs 350, information bits are transmitted through the transport network 330. In that case, the transport network 330 could impose a limit on the radio scheduler 326 for (i) the net throughput (Max_NetTP) or (ii) the maximum number (Max_InformationBits) of information bits to be transmitted in a given time window (TimeWindow).

The radio scheduler 326 can control the offered "load" to the transport network 330 using the DR limits received from the TN scheduler 333. In general, the radio scheduler 326 executes a MAC scheduling algorithm that operates as follows to allocate time-frequency resources to its active UEs 360:
  a) The UEs 360 are sorted/prioritized in some way, keeping into account some of the following criteria:
    Previous allocations;
    The required QoS of each UE 360;
    The actual channel (or its estimate) that influences link adaptation and modulation and coding scheme (MCS) choice, chosen MCS rate, hybrid automatic repeat request (HARQ) status, beam selection and precoding, etc.
  b) Resources are allocated to the first UE 360 that is output by the sorting/prioritization procedure. Note that, in frequency-selective scheduling, there can be different sorting procedures for different resource elements (REs).
  c) Some UE limitations can be considered, such as one or more of minimum or maximum number of REs per allocated UE or the UE buffer condition/packet size.
Known scheduling approaches, like Round Robin, Weighted Round Robin, Proportional Fair, Alpha-Fair, Maximum TP, Hard and Soft Token-based mechanisms, and all other metric-based scheduling, fall under this generic description. This formulation enables unique ways to modify existing scheduling procedures to consider the TN load limit, depending on the particular type of TN load.

When the transport network 330 conveys quantized complex symbols for every time-frequency slot, in case of TN congestions, the network 300 can properly react if the radio scheduler 326 adopts a different behavior than the previous solutions. In particular, the above point c) should be substituted by the following sentence:
  c) Some UE limitations can be considered, such as one or more of minimum or maximum number of REs per allocated UE, the UE buffer condition/packet size, maximum total number of PRBs per time slot, maximum number of time-frequency symbols in a predefined time window, or maximum allocated bandwidth.

More practically, the MAC scheduling procedure will allocate PRBs or, more generally, resources as was done before, until the scheduling reaches the limit on one or more of the number of PRBs per time slot, the maximum number of time-frequency symbols in a pre-defined time window, or the maximum allocated bandwidth. In some implementations, only one of these candidates is used to terminate scheduling.

When the transport network 330 conveys encoded information (i.e., encoded bits in DL, LLRs of encoded bits in UL), in case of TN congestions, the network 300 can properly react if the radio scheduler 326 adopts a different behavior than the previous solutions. In particular, the above point c) should be substituted by the following sentence:
  c) Some UE limitations can be considered, such as one or more of minimum or maximum number of REs per allocated UE, the UE buffer condition/packet size, maximum encoded throughput, or maximum number of encoded bits to be transmitted/received in a certain configurable time window.

More practically, the modification is similar to the modification for quantized complex symbols, but with different "bit-rate throttling rules." In some implementations, only one of these candidates is used to terminate scheduling.

When the transport network 330 conveys information bits, in case of TN congestions, the network 300 can properly react if the radio scheduler 326 adopts a different behavior than the previous solutions. In particular, the above point c) should be substituted by the following sentence:
  c) Some UE limitations can be considered, such as one or more of minimum or maximum number of REs per allocated UE, the UE buffer condition/packet size, maximum net throughput, or maximum number of information bits to be transmitted/received in a certain configurable time window.

In some implementations, only one of these candidates is used to terminate scheduling. Here, too, the modification is similar to the modifications for quantized complex symbols and encoded information, but with different "throttling rules." In this case, an optional procedure can be triggered to increase the number of allocated PRBs/REs while conveying the same amount of information bits that constitutes the bottleneck. This procedure could allow a better reliability to be achieved by the network, since spreading the available power of a transmission over more frequency resources is typically beneficial. This is not done in normal operations, because of the tradeoff between reliability and spectral efficiency. However, in this case, the tradeoff is removed due to the limited amount of information that must be transmitted in a time slot/window.

One can obtain this increased reliability effect by applying one of the following methods, after the MAC scheduling procedure has been run by the radio scheduler 326, meaning after link adaptation (LA) has already been performed. Thus, the MCS index $MCS_i$ for every allocated UE i∈U has already been chosen, and there are still some free PRBs or REs FP that can be allocated, where FP is the number of unallocated free PRBs or REs. Note that the possible MCS indexes are sorted from the lowest rate (MCS=1) to the highest rate, thus with descending reliability. The current resources allocated to a UE i∈U are UE $R_i$. Note that, if only a subset of users is to have increased reliability, then the set U can include only the users matching a certain "eligibility" requirement, e.g., on the QoS flag or slice flag.

The following is an example of the MCS step with prioritization for the MAC scheduling performed by the radio scheduler 326.
1. Remove from the allocated UE set U all UEs with MCS=1.
2. Sort UEs in U based on sorting rule (either highest wideband scheduling metric, QoS flag, or other)
3. Start with i=1
4. While (FP>0 && |U|>0)
   a. $MCS_i = MCS_i - 1$
   b. Compute the new required resources $R_i'$ to allocate the UE i with the new MCS. If frequency-selective CSI is available, then find the PRB/RE candidates for this extended allocation and, if needed, modify the allocation of the other UEs.
   c. If $R_i' - R_i > FP$
      i. Revert MCS: change→$MCS_i = MCS_i + 1$, keep old $R_i$
      ii. Remove i from U
      iii. i=i−1
   d. Else
      i. $FP = FP - (R_i' - R_i)$
      ii. $R_i = R_i'$
      iii. Confirm the new allocation, and discard the old one
   e. i=i+1,
   f. If i=|U|+1, then i=1

The following is an example of the MCS adaption with fair prioritization for the MAC scheduling performed by the radio scheduler 326, where ρ(MCS) is the equivalent rate of MCS with index MCS, and TP is the total number of PRBs/REs that the radio scheduler 326 can allocate.
1. Remove from the allocated UE set U all UEs with MCS=1.
2. Sort UEs in U based on sorting rule (either highest wideband scheduling metric, QoS flag, or other)
3. Start with i=1
4. While (FP>0 && |U|>0)
   a.

$$\rho' = \frac{\rho(MCS_i)}{\frac{TP}{FP}}$$

b. Find new $$MCS' = \sup_m \{m \in MCS \,|\, \rho' \geq \rho(m)\},$$

where, in this case, the supremum function (sup) returns the index (m) of the highest-rate MCS that satisfies the reliability condition.
   c. Compute the new required resources $R_i'$ to allocate the UE i with the new MCS'. If frequency-selective CSI is available, then find the PRB/RE candidates for this extended allocation and, if needed, modify the allocation of the other UEs.
   d. If $MCS' = MCS_i$
      i. Remove i from U
      ii. i=i−1
   e. Else
      i. $FP = FP - (R_i' - R_i)$
      ii. $MCS_i = MCS'$
      iii. $R_i = R_i'$
      iv. Confirm the new allocation, and discard the old one
   f. i=i+1,
   g. If i=|U|+1, then i=1

As the example described in FIG. 6 suggests, UL scheduling decisions are made some time (e.g., 4 ms) before the actual MFH transmission by the RUs 350. Therefore, if there is a change in the load limit, then the radio scheduler 326 should know that for the remainder of the current 8-ms DBA cycle window. The limit to be adopted by the radio scheduler 326 may be different from the communicated limit from the TN scheduler 333. In particular, the radio scheduler 326 considers the number (A) of MFH UL transmissions already allocated during the current DBA cycle and adjusts the remaining transmissions to achieve the specified limit for the entire DBA cycle, which has a total of B (e.g., 8) slots. The temporary load limit L' used by the radio scheduler 326 for the remaining (B-A) slots of the DBA cycle is given by the following equation:

$$L' = \left[\frac{\left(B \cdot L_{new} - \sum_{i=1}^{A} S_i\right)}{B - A}\right]^+$$

where $L_{new}$ is the newly communicated load limit for each radio scheduler time slot, $S_i$ is the already scheduled load for the i-th time slot of the DBA cycle, and the square brackets with the plus sign means that the temporary load limit L' is set to zero if the value inside the brackets is negative. Note that, at the start of the next DBA cycle, assuming that the load limit has not be updated again, the load limit for each time slot will be $L_{new}$. In alternative implementations, instead of the DBA cycle, the radio scheduler 326 scales the temporary load limit L' for the remaining time slots in a different specified time period, which may be explicitly communicated from the TN scheduler 333 to the radio scheduler 326.

Figure 7:
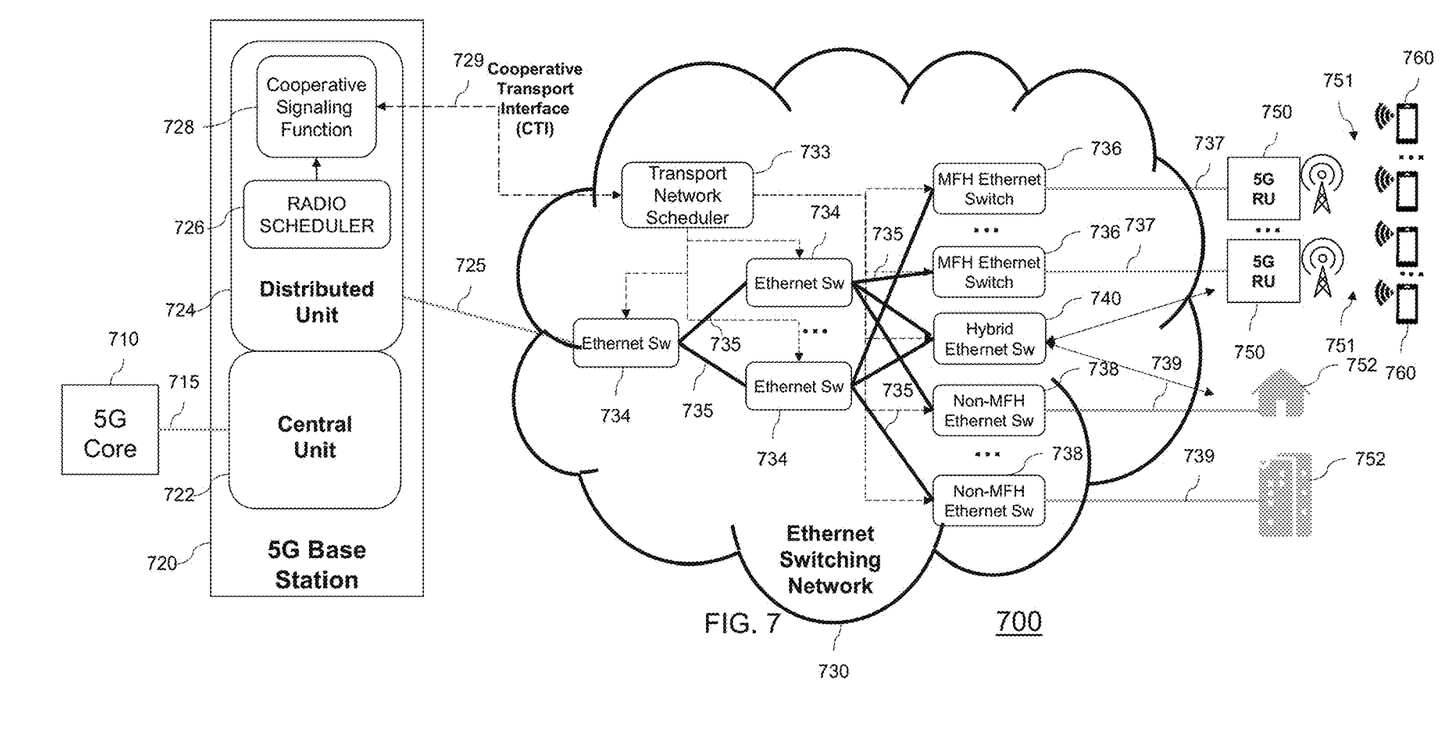
FIG. 7 is a block diagram of an instance 700 of the 5G RAN communication network 100 of FIG. 1.

FIG. 7 is a block diagram of an instance 700 of the 5G RAN communication network 100 of FIG. 1 in which the transport network 130 of FIG. 1 is implemented as an Ethernet transport network 730 in which the TN scheduler 733 performs dynamic bandwidth allocation for a network of Ethernet switches 734, 736, and 738 interconnected by links 735, where the MFH Ethernet switches 736 correspond to the MFH end points 136 of FIG. 1 and the non-MFH Ethernet switches 738 correspond to the non-MFH end points 138 of FIG. 1. All other elements of the 5G RAN network 700 of FIG. 7 are analogous to the similarly labeled elements of the 5G RAN network 100 of FIG. 1.

Although embodiments of this disclosure have been described in the context of 5G RAN networks, other embodiments of the disclosure may be in the context of other suitable types of existing radio access networks with simplified radio or split-processing architecture such as (without limitation) 4G LTE with split-processing eNB architecture, WiFi, WiMax, Bluetooth, etc. or future radio access networks.

Some embodiments of the disclosure are apparatus for a radio access network (RAN), the apparatus comprising a distributed unit (DU); a transport network (TN); and at least one remote unit (RU) connected to the DU via the transport network and configured to communicate via wireless communications traffic with one or more user equipment (UE) or dedicated radio bearer (DRB) devices. The DU comprises a radio scheduler configured to perform medium access control (MAC) scheduling for the wireless communications traffic. The transport network is configured to handle TN traffic comprising both (i) mobile front haul (MFH) traffic corresponding to the wireless communications traffic and (ii) non-MFH traffic corresponding to other traffic. The transport network comprises a TN scheduler configured to schedule the TN traffic. The TN scheduler is configured to transmit bandwidth-related information regarding the TN traffic to the radio scheduler. The radio scheduler is configured to perform subsequent MAC scheduling based on the bandwidth-related information received from the TN scheduler.

In some of the above embodiments, the radio scheduler is configured to determine an MFH data rate estimate for the MFH traffic between the DU and the at least one RU; the TN scheduler is configured to schedule the MFH traffic and non-MFH traffic based on (i) the MFH data rate estimate received from the radio scheduler and (ii) a non-MFH data rate estimate; the TN scheduler is configured to determine whether to transmit a current MFH data rate limit to the radio scheduler and, if so, transmit the current MFH data rate limit to the radio scheduler; and the radio scheduler is configured to perform the subsequent MAC scheduling based on the current MFH data rate limit received from the TN scheduler.

In some or all of the above embodiments, the radio scheduler is configured to perform MFH-aware MAC scheduling based on the current MFH data rate limit.

In some or all of the above embodiments, the radio scheduler is configured to perform MFH-agnostic MAC scheduling, if the radio scheduler determines that the current MFH data rate limit is more than a specified MFH data rate threshold; and the radio scheduler is configured to perform the MFH-aware MAC scheduling, if the radio scheduler determines that the current MFH data rate limit is less than the specified MFH data rate threshold.

In some or all of the above embodiments, the MFH-aware MAC scheduling depends on one or more of (a) whether the TN is configured to transport quantized complex symbols, in which case, the MFH-aware MAC scheduling is configured to take into account one or more of (i) a specified maximum total number of process resource blocks (PRBs) per time slot, (ii) a specified maximum number of time-frequency symbols in a pre-defined time window, (iii) and a specified maximum allocated bandwidth; (b) whether the TN is configured to transport encoded bits, in which case, the MFH-aware MAC scheduling is configured to take into account one or more of (i) a specified maximum encoded throughput and (ii) a specified maximum number of encoded bits to be transmitted/received in a certain configurable time window; and (c) whether the TN is configured to transport information bits, in which case, the MFH-aware MAC scheduling is configured to take into account one or more of (i) a specified maximum net throughput and (ii) a specified maximum number of information bits to be transmitted/received in a certain configurable time window.

In some or all of the above embodiments, the radio scheduler is configured to scale the current MFH data rate limit based on a number of remaining MFH time slots in a specified time period to achieve a desired average MFH data rate for the specified time period.

In some or all of the above embodiments, the transport network is configured to employ a statistical multiplexing technique to transport data.

In some or all of the above embodiments, the transport network is configured to employ either time-division multiplexed, passive optical network (TDM-PON) transport technology or Ethernet transport technology.

In some or all of the above embodiments, the radio scheduler is configured to perform MAC scheduling for UE and DRB uplink traffic that is independent of MAC scheduling for UE and DRB downlink traffic.

In some or all of the above embodiments, the bandwidth-related information comprises combined bandwidth-related information for both uplink TN traffic and downlink TN traffic.

In some or all of the above embodiments, the bandwidth-related information comprises independent bandwidth-related information for the uplink TN traffic and independent bandwidth-related information for the downlink TN traffic.

In some or all of the above embodiments, the DU is configured to transmit at least some of the bandwidth-related information to a central unit CU of the RAN.

Some embodiments of the disclosure are a distributed unit for a radio access network further comprising (i) a transport network and (ii) at least one remote unit connected to the DU via the transport network and configured to communicate via wireless communications traffic with one or more user equipment or dedicated radio bearer devices. The DU comprises a radio scheduler configured to perform medium access control MAC scheduling for the wireless communications traffic. The transport network is configured to handle TN traffic comprising both (i) MFH traffic corresponding to the wireless communications traffic and (ii) non-MFH traffic corresponding to other traffic. The transport network comprises a TN scheduler configured to schedule the TN traffic. The TN scheduler is configured to transmit bandwidth-related information regarding the TN traffic to the radio scheduler. The radio scheduler is configured to perform subsequent MAC scheduling based on the bandwidth-related information received from the TN scheduler.

Some embodiments of the disclosure are a TN scheduler for a transport network for a radio access network further comprising (i) a distributed unit and (ii) at least one remote unit connected to the DU via the transport network and configured to communicate via wireless communications traffic with one or more user equipment or dedicated radio bearer devices. The DU comprises a radio scheduler configured to perform medium access control scheduling for the wireless communications traffic. The transport network is configured to handle TN traffic comprising both (i) MFH traffic corresponding to the wireless communications traffic and (ii) non-MFH traffic corresponding to other traffic. The TN scheduler is configured to schedule the TN traffic. The TN scheduler is configured to transmit bandwidth-related information regarding the TN traffic to the radio scheduler. The radio scheduler is configured to perform subsequent MAC scheduling based on the bandwidth-related information received from the TN scheduler.

Some embodiments of the disclosure are a method for handling traffic in a radio access network comprising (i) a distributed unit, (ii) a transport network, and (iii) at least one remote unit connected to the DU via the transport network and configured to communicate via wireless communications traffic with one or more user equipment or dedicated radio bearer devices. The DU comprises a radio scheduler that performs medium access control MAC scheduling for the wireless communications traffic. The transport network handles TN traffic comprising both (i) MFH traffic corresponding to the wireless communications traffic and (ii) non-MFH traffic corresponding to other traffic. The transport network comprises a TN scheduler that schedules the TN traffic. The TN scheduler transmits bandwidth-related information regarding the TN traffic to the radio scheduler. The radio scheduler performs subsequent MAC scheduling based on the bandwidth-related information received from the TN scheduler.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding terminals, nodes, ports, or paths may be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. Apparatus for a radio access network RAN, the apparatus comprising:
    a distributed unit (DU);
    a transport network (TN); and
    at least one remote unit (RU) connected to the DU via the transport network and configured to communicate wireless communications traffic with one or more user equipment (UE) or dedicated radio bearer (DRB) devices, wherein
    the DU comprises a radio scheduler configured to perform medium access control (MAC) scheduling for the wireless communications traffic,
    the transport network is configured to handle TN traffic comprising both (i) mobile front haul (MFH) traffic corresponding to the wireless communications traffic and (ii) non-MFH traffic corresponding to non-wireless communications traffic,
    the TN comprises a TN scheduler configured to schedule the TN traffic,
    the TN scheduler is configured to transmit bandwidth-related information regarding the TN traffic to the radio scheduler, and
    the radio scheduler is configured to perform subsequent MAC scheduling based on the bandwidth-related information received from the TN scheduler.

2. The apparatus of claim 1, wherein
    the radio scheduler is configured to determine an MFH data rate estimate for the MFH traffic between the DU and the at least one RU;
    the TN scheduler is configured to schedule the MFH traffic and non-MFH traffic based on (i) the MFH data rate estimate received from the radio scheduler and (ii) a non-MFH data rate estimate;
    the TN scheduler is configured to determine whether to transmit a current MFH data rate limit to the radio scheduler and, if so, transmit the current MFH data rate limit to the radio scheduler; and
    the radio scheduler is configured to perform the subsequent MAC scheduling based on the current MFH data rate limit received from the TN scheduler.

3. The apparatus of claim 2, wherein the radio scheduler is configured to perform MFH-aware MAC scheduling based on the current MFH data rate limit.

4. The apparatus of claim 3, wherein
    the radio scheduler is configured to perform MFH-agnostic MAC scheduling, if the radio scheduler determines that the current MFH data rate limit is more than a specified MFH data rate threshold; and
    the radio scheduler is configured to perform the MFH-aware MAC scheduling, if the radio scheduler determines that the current MFH data rate limit is less than the specified MFH data rate threshold.

5. The apparatus of claim 3, wherein the MFH-aware MAC scheduling depends on one or more of:
    (a) whether the TN is configured to transport quantized complex symbols, in which case, the MFH-aware MAC scheduling is configured to take into account one or more of (i) a specified maximum total number of process resource blocks PRBs per time slot, (ii) a specified maximum number of time-frequency symbols in a pre-defined time window, (iii) and a specified maximum allocated bandwidth;
    (b) whether the TN is configured to transport encoded bits, in which case, the MFH-aware MAC scheduling is configured to take into account one or more of (i) a specified maximum encoded throughput and (ii) a specified maximum number of encoded bits to be transmitted/received in a certain configurable time window; and
    (c) whether the TN is configured to transport information bits, in which case, the MFH-aware MAC scheduling is configured to take into account one or more of (i) a specified maximum net throughput and (ii) a specified maximum number of information bits to be transmitted/received in a certain configurable time window.

6. The apparatus of claim 2, wherein the radio scheduler is configured to scale the current MFH data rate limit based on a number of remaining MFH time slots in a specified time period to achieve a desired average MFH data rate for the specified time period.

7. The apparatus of claim 1, wherein the transport network is configured to employ a statistical multiplexing technique to transport data.

8. The apparatus of claim 7, wherein the transport network is configured to employ either time-division multiplexed, passive optical network TDM-PON transport technology or Ethernet transport technology.

9. The apparatus of claim 1, wherein the radio scheduler is configured to perform MAC scheduling for UE and DRB uplink traffic that is independent of MAC scheduling for UE and DRB downlink traffic.

10. The apparatus of claim 1, wherein the bandwidth-related information comprises combined bandwidth-related information for both uplink TN traffic and downlink TN traffic.

11. The apparatus of claim 1, wherein the bandwidth-related information comprises independent bandwidth-related information for uplink TN traffic and independent bandwidth-related information for downlink TN traffic.

12. The apparatus of claim 1, wherein the DU is configured to transmit at least some of the bandwidth-related information to a central unit CU of the RAN.

13. A distributed unit (DU) for a radio access network (RAN), the RAN further comprising (i) a transport network (TN) and (ii) at least one remote unit (RU) connected to the DU via the transport network and configured to communicate wireless communications traffic with one or more user equipment (UE) or dedicated radio bearer (DRB) devices, the DU comprising:
    at least one processor; and
    at least one memory including computer program code;
    the at least one memory and the computer program code configured to, with the at least one processor, cause the DU at least to perform,
    medium access control (MAC) scheduling for the wireless communications traffic; wherein
        the transport network is configured to handle TN traffic comprising both (i) MFH traffic corresponding to the wireless communications traffic and (ii) non-MFH traffic corresponding to non-wireless communications traffic, the TN is configured to schedule the TN traffic, the TN is configured to transmit bandwidth-related information regarding the TN traffic to the DU, and the at least one memory and the computer program code is further configured to, with the at least one processor, cause the DU at least to perform subsequent MAC scheduling based on the bandwidth-related information received from the TN.

14. A TN scheduler for a transport network (TN) for a radio access network (RAN), the RAN further comprising (i) a distributed unit (DU) and (ii) at least one remote unit (RU) connected to the DU via the TN and configured to communicate wireless communications traffic with one or more user equipment (UE) or dedicated radio bearer (DRB) devices, the DU being configured to perform medium access control (MAC) scheduling for the wireless communications traffic, the TN scheduler comprising:

at least one processor; and at least one memory including computer program code;

the at least one memory and the computer program code configured to, with the at least one processor, cause the TN scheduler to at least, handle TN traffic comprising both (i) MFH traffic corresponding to the wireless communications traffic and (ii) non-MFH traffic corresponding to-non-wireless communications traffic;

schedule the TN traffic, and transmit bandwidth-related information regarding the TN traffic to the DU, the DU being configured to perform subsequent MAC scheduling based on the bandwidth-related information received from the TN.

15. A method for handling traffic in a radio access network (RAN) comprising (i) a distributed unit (DU), (ii) a transport network (TN), and (iii) at least one remote unit (RU) connected to the DU via the TN and configured to communicate wireless communications traffic with one or more user equipment (UE) or dedicated radio bearer (DRB) devices, the TN configured to handle TN traffic comprising both (i) MFH traffic corresponding to the wireless communications traffic and (ii) non-MFH traffic, corresponding to-non-wireless communications traffic, the method comprising:

performing medium access control (MAC) scheduling for the wireless communications traffic;

scheduling the TN traffic;

transmitting bandwidth-related information regarding the TN traffic to the radio scheduler; and performing subsequent MAC scheduling based on the bandwidth-related information received from a TN scheduler.

* * * * *